United States Patent [19]

Kawada et al.

[11] Patent Number: 4,714,852
[45] Date of Patent: Dec. 22, 1987

[54] PERMANENT-MAGNET FIELD SYNCHRONOUS MOTOR

[75] Inventors: Shigeki Kawada; Yoichi Amemiya; Masatoyo Sogabe, all of Hachioji; Kazushi Kumagai, Hino, all of Japan

[73] Assignee: Fanuc Ltd., Yamanashi, Japan

[21] Appl. No.: 862,358

[22] PCT Filed: Aug. 28, 1985

[86] PCT No.: PCT/JP85/00473

§ 371 Date: Jun. 24, 1986

§ 102(e) Date: Jun. 24, 1986

[87] PCT Pub. No.: WO86/01651

PCT Pub. Date: Mar. 13, 1986

[30] Foreign Application Priority Data

Aug. 29, 1984 [JP] Japan .................. 59-178242

[51] Int. Cl.⁴ .............................................. H02K 21/12
[52] U.S. Cl. ....................................... 310/156; 310/112
[58] Field of Search ............... 310/162, 156, 182, 168, 310/114, 125, 126, 112, 111

[56] References Cited

U.S. PATENT DOCUMENTS

| | | | |
|---|---|---|---|
| 2,637,825 | 5/1953 | Moore | 310/156 |
| 3,223,916 | 12/1965 | Shafranek et al. | 310/168 X |
| 3,303,369 | 2/1967 | Erickson | 310/168 |
| 3,319,100 | 5/1967 | Erickson | 310/168 |
| 3,321,652 | 5/1967 | Opel | 310/168 |
| 4,486,678 | 12/1984 | Olson | 310/156 |

FOREIGN PATENT DOCUMENTS 50-5923 2/1975 Japan.
58-46280 3/1983 Japan.

Primary Examiner—Donovan F. Duggan
Attorney, Agent, or Firm—Armstrong, Nikaido, Marmelstein & Kubovcik

[57] ABSTRACT

A permanent-magnet field synchronous motor comprises a rotor body (22) having a cylindrical outer surface. A plurality of permanent magnets (25) attached to the cylindrical outer surface of the rotor body and arranged in the circumferential direction thereof form a field system. Each of the permanent magnets has an outer surface (25b) which extends circumferentially in parallel to the cylindrical outer surface of the rotor body and also has a constant thickness in the whole thereof. The inner surface and the outer surface of each of the permanent magnets has a certain configuration, respectively, each of which is composed of a plurality of straight lines and approximates to a contour line consisting of half-sine curves ($S_1$, $S_2$) extending between the circumferential opposite ends of each of the permanent magnets when developed in a plane surface.

2 Claims, 3 Drawing Figures

PERMANENT-MAGNET FIELD SYNCHRONOUS MOTOR

TECHNICAL FIELD

The present invention relates to an improvement of a permanent-magnet field synchronous motor comprising a rotor body having a cylindrical outer surface and a plurality of permanent magnets as a field system attached on the outer surface of the rotor body and arranged in a circumferential direction thereof.

BACKGROUND ART

A permanent-magnet field synchronous motor comprising a rotor body having a cylindrical outer surface and a plurality of permanent magnets as a field system attached on the outer surface of the rotor body and arranged in a circumferential direction thereof has been known. In this kind of motor, each of the permanent magnets is magnetized so that magnetic poles are formed on the inside and outside surfaces thereof, respectively, and that the magnetic poles on the outside surfaces of the permanent magnets are alternately different in the circumferential direction.

When using such a permanent-magnet field synchronous motor as a servo motor, it is necessary to reduce fluctuation of a torque produced in the motor as much as possible in order to smoothly rotate a rotor assembly. Therefore, it is desirable that a characteristic of electromotive force produced in the windings of the stator changes sinusoidally in relation to a time. For this, as shown in FIG. 1, a construction in which a gap defined between the outside surfaces of the permanent magnets 12 fixed to the cylindrical outer surface of the rotor body 11 and the cylindrical inner surface of the stator 13 changes sinusoidally in accordance with rotation of the rotor body 11, has been adopted for a motor.

In the motor having such a construction, however, since the inner surface of the stator 13 is substantially a cylindrical surface, it has been necessary to give the outside surface of each of the permanent magnets 12 a specially curved shape in order to obtain such a gap sinusoidally changeable between the cylindrical inner surface of the stator and the permanent magnets. Generally, the permanent magnet has been made by a press sintering. When making a permanent magnet having such a specially curved shape, it is necessary to make a press mold having a specially curved concavity. Therefore, processing of such a permanent magnet is difficult. Further, a grinding process of the outside surface of such a permanent magnet, performed after molding thereof, is also difficult. Therefore, the processing accuracy of the permanent magnet is decreased. Furthermore, since such a permanent magnet has a thickness which becomes gradually thinner toward the opposite ends thereof in a circumferential direction, a pressing force tends to be applied unevenly to the permanent magnet, and thus an internal stress in the permanent magnet is not uniformly distributed. Consequently, the motor has a disadvantage in that the permanent magnet, being hard and brittle in general, is apt to be easily broken.

DISCLOSURE OF THE INVENTION

An object of the present invention is to provide a permanent-magnet field synchronous motor in which a characteristic of electromotive force produced in the windings of the stator changes sinusoidally in relation to time, by the use of permanent magnets having a constant thickness.

According to the present invention, there is provided a permanent-magnet field synchronous motor comprising: a rotor body having a cylindrical outer surface; and a plurality of permanent magnets attached to said cylindrical outer surface of said rotor body, each of said permanent magnets having an outer surface which extends circumferentially in parallel to said cylindrical outer surface of said rotor body and also having a constant thickness in the whole thereof, said outer surface and an inner surface of each of said permanent magnets having a certain configuration, respectively, each of which is composed of a plurality of straight lines and approximates to a contour line consisting of half-sine curves extending between the circumferential opposite ends of each of said permanent magnets when developed in a plane surface.

According to the construction of the present invention, although the outer surface of each of the permanent magnets and the inner cylindrical surface of a stator define therebetween a constant gap in the circumferential direction thereof, the width of each of the permanent magnets in the axial direction thereof increases and then decreases in the circumferential direction along the contour lines approximate to half-sine curves illustrated in a cylindrical surface. Consequently, a characteristic of a magnetic flux density passing through the windings of the stator changes sinusoidally in relation to time while the permanent magnets as a field system rotate together with the rotor body. As a result, a fluctuation of torque produced by the motor is decreased and thus a smooth rotation-output is obtained. The outer surface of each of the permanent magnets extends in parallel to the cylindrical outer surface of the rotor body to define a constant thickness thereof, and the configuration of each of the permanent magnets is composed of a plurality of straight lines. Therefore, a press mold for the permanent magnets can be easily made, and the outer surface of the permanent magnet can be easily processed with a high processing accuracy. Further, since each of the permanent magnets has a constant thickness in the whole thereof, a pressing force can be evenly applied to the permanent magnet. Therefore, the break of the permanent magnet can be prevented, and anisotropy in the permanent magnets can be increased. As a result, the magnetic property of the permanent magnets can be improved, and thus the magnetic property of the permanent-magnet field synchronous motor can be improved.

Preferably, the inner surface and outer surface of each of the permanent magnets have a certain configuration, respectively, each of which configurations is composed of straight lines and is inscribed in or circumscribed on a virtual contour line consist of a pair of half-sine curves extending symmetrically along the circumferential center line of each of the permanent magnets. More preferably, the inner surface and outer surface of each of the permanent magnets have symmetrical configurations, respectively, in relation to the circumferential and axial center lines thereof. When using such a configuration, each permanent magnet has a configuration which is substantially oval in shape, and thus a pressing force applied to the permanent magnet can be more uniformly distributed during the press sintering thereof.

Preferably, a plurality of permanent magnets having the same configuration are spaced from each other in the circumferential direction of the rotor body and arranged adjacent to each other in the direction of rotation axis of the rotor body. When using such an arrangement, the permanent magnets can be arranged on the cylindrical outer surface of the rotor body with a high density. Therefore, a magnetic flux density in the whole of the field system can be increased.

The foregoing and other features and advantages of the present invention will become apparent from the following detailed description with reference to the attached drawings.

BEST MODE FOR CARRYING OUT THE INVENTION

Figure 1:
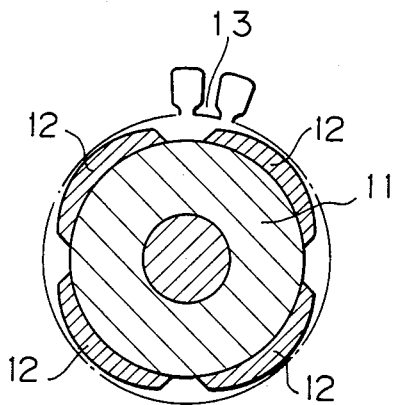
FIG. 1 is a schematical cross-section view illustrating a construction of the conventional permanent-magnet field synchronous motor.
Figure 2:
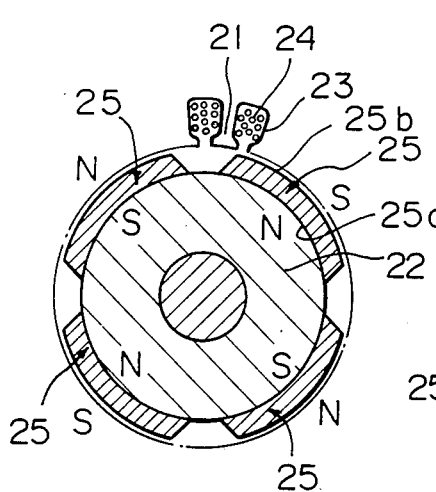
FIG. 2 is a schematical cross-section view of the permanent-magnet field synchronous motor illustrating an embodiment of the present invention.
Figure 3:
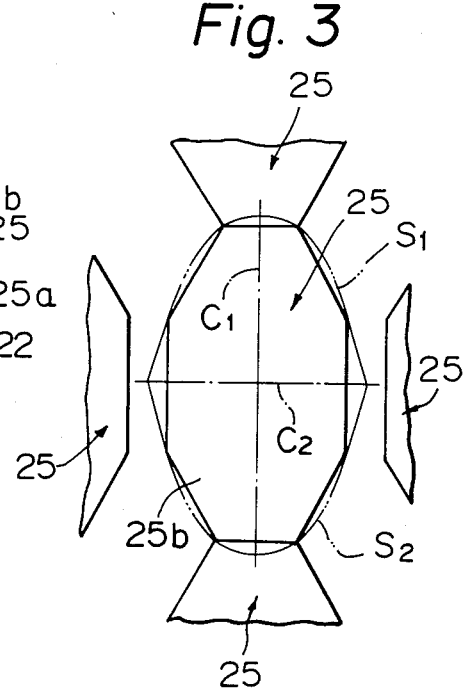
FIG. 3 is a development view of the configuration of the permanent magnet attached on the outer surface of the rotor body of the motor shown in FIG. 2.

Referring to FIGS. 2 and 3, the permanent-magnet field synchronous motor comprises a stator 21 having therein a cylindrical bore, and a rotor body 22 arranged rotatably in the bore of the stator 21. The rotor body 22 has a cylindrical outer surface which is arranged coaxially with the cylindrical inner surface of the stator 21. The cylindrical inner surface of the stator 21 is formed with slots 23 extending in the axial direction. Stator-windings 24 are passed through the slots 23. A plurality of permanent magnets 25 forming a field system are fixed to the cylindrical outer surface of the rotor body 21.

Each permanent magnet 25 has an inner surface 25a extending circumferentially so as to fit the cylindrical outer surface of the rotor body 22, and has a constant thickness in the whole thereof so that an outer surface 25b of each of the permanent magnets 25 and the cylindrical inner surface of the stator 21 define therebetween a constant gap. That is, the outer surface 25b of each of the permanent magnets 25 extends in parallel to the outer surface of the rotor body 22.

As shown in FIG. 3, the outer surface 25b of each of the permanent magnets 25 has a configuration composed of a plurality of straight lines so that it approximates to an imaginary contour line consist of a pair of half-sine curves $S_1$ and $S_2$ when developed in a plane surface. The inner surface 25a of each of the permanent magnets 25 has the same configuration as that of the outer surface 25b thereof. Further, the configuration of the inner and outer surfaces 25a and 25b of each of the permanent magnets 25 consists of a pair of contour line sections which are symmetrical to each other in relation to a longitudinal center line $C_1$ parallel to the rotation axis of the rotor body 22, and to a circumferential center line $C_2$ perpendicular to the longitudinal center line $C_1$.

In more detail, the configuration of the inner and outer surfaces 25a and 25b of each of the permanent magnets 25 forms, in this embodiment, and octagonal shape which inscribes the above-mentioned half-sine curves $S_1$ and $S_2$ when developed in a plane surface.

The permanent magnets 25 having the above-described configuration are arranged and spaced from each other in the circumferential direction of the rotor body 22. The permanent magnets 25 are also arranged adjacent to each other in the axial direction of the rotor body 22.

In the permanent-magnet field synchronous motor having the above-described construction, the configuration of the inner and outer surfaces 25a and 25b of each of the permanent magnets 25 is composed of a plurality of straight lines so that it approximates to an imaginary contour line consist of a pair of half-sine curves $S_1$ and $S_2$ when developed in a plane surface. Consequently, the density of the field flux passing through the stator-windings 23 is changed sinusoidally during the rotation of the permanent magnets 25 on the rotor body 22, although the outer surface of each of the permanent magnets 25 and the cylindrical inner surface of the stator 21 define therebetween a constant gap in the whole thereof. Therefore, the fluctuation of the torque produced by the motor is decreased, and thus a smooth-rational output of the motor is obtained.

Since the inner and outer surfaces 25a and 25b of each of the permanent magnets 25 are partially cylindrical surfaces, respectively, a pressing mold for the permanent magnets can be easily manufactured. Further, since the outer surface 25b of each of the permanent magnets 25 is a partially cylindrical surface, a finish-grinding process can be easily applied to the outer surface after molding thereof, and thus a high processing accuracy can be obtained.

Further, since the configuration of the inner and outer surfaces 25a and 25b of each of the permanent magnets 25 is not composed of a pair of half-sine curves $S_1$ and $S_2$, but composed of a plurality of straight lines so that it approximates thereto when developed in a plane surface, the configuration of the permanent magnets 25 can be easily processed.

Furthermore, since each permanent magnet 25 has a constant thickness in the whole thereof, unevenness in the pressing force applied thereon does not easily occur during the press sintering thereof, and thus the permanent magnet 25 is not easily broken.

The process of the permanent magnet 25 is accomplished in such a manner that the inner and outer surfaces 25a and 25b of the permanent magnet 25 are magnetized to form thereon an N or S pole after the press sintering and the subsequent machining of the permanent magnet 25 is finished. Since the pressing force is uniformly added to the permanent magnet 25 in the thickness direction thereof, and thus the internal stress is uniformly distributed in the permanent magnet 25 during the press sintering thereof, a permanent magnet 25 having a high anisotropy can be obtained.

As a result, the strength and the magnetic characteristics of the permanent magnet 25 can be increased. Therefore, permanent magnets 25, which are expensive in general, can be made thin and thus the cost thereof can be reduced.

Although the foregoing explanation has been made in reference to one embodiment of the present invention, the present invention is not limited to the above-mentioned embodiment. For example, the configuration of the inner and outer surfaces of each of the permanent magnets is not limited to and octagonal shape when developed in a plane surface, and it may be any other polygonal shape, it also may be any polygonal shape circumscribed with half-sine curves. Further, the permanent magnet may have a configuration such as obtained when the permanent magnet shown in FIG. 3 is divided into two pieces along the circumferential center line thereof. Furthermore, although the above mentioned embodiment includes a field system having four poles, the present invention is not limited thereto.

CAPABILITY OF EXPLOITATION IN INDUSTRY

As apparent from the foregoing explanation, the permanent magnets according to the present invention can be easily manufactured and the strength and the magnetic properties of the permanent magnets can be increased. Therefore, the permanent-magnet field synchronous motor having excellent magnetic properties can be cheaply provided.

We claim:

1. A permanent-magnet field synchronous motor comprising:
   a rotor body having a cylindrical outer surface; and
   a plurality of permanent magnets attached to said cylindrical outer surface of said rotor body, each of said permanent magnets having a constant thickness, such that an outer surface thereof extends circumferentially parallel with said cylindrical outer surface of said rotor body, each permanent magnet having a polygonal shape, said polygonal shape having a shape approximating that formed by a contour line superimposed upon said rotor body, said contour line having the shape of a half-sine curve above a center line superimposed circumferentially around said rotor body and said contour line having a mirror image of the half-sine curve below the centerline, said polygonal shape also being inscribed in said contour line, and wherein each of said plurality of permanent magnets have the same configuration and are arranged and spaced from one another circumferentially around said rotor body, and are arranged with at least one of said permanent magnets being adjacent to another in the axial direction of the rotor body.

2. The permanent-magnet field synchronous motor of claim 1, wherein each of said permanent magnets is symmetrical with respect to a circumferential center line and to an axial center line of said permanent magnet.

* * * * *